United States Patent [19]

Turner

[11] Patent Number: 4,776,557

[45] Date of Patent: Oct. 11, 1988

[54] FORMWORK PANEL

[75] Inventor: Colin F. Turner, West Midlands, United Kingdom

[73] Assignee: Rapid Metal Developments Ltd., Walsall, England

[21] Appl. No.: 865,137

[22] Filed: May 20, 1986

[30] Foreign Application Priority Data

May 22, 1985 [GB] United Kingdom ............... 8512893

[51] Int. Cl.$^4$ ............................................. E04G 9/04
[52] U.S. Cl. .................. 249/196; 52/127.11; 52/231; 52/584; 52/807; 249/47; 249/192; 249/219.1; 403/252
[58] Field of Search ...................... 249/33, 44, 47, 189, 249/192, 193, 195, 196, 219 R, 219 W; 403/252, 254, 255, 187, 230, 231, 192, 247, 361; 52/807, 793, 584, 127.11

[56] References Cited

U.S. PATENT DOCUMENTS

| | | | |
|---|---|---|---|
| 2,140,772 | 12/1938 | Slayter et al. | 52/127.11 |
| 2,535,277 | 12/1950 | Fama | 249/196 |
| 3,169,294 | 2/1965 | Bonin et al. | 249/196 |
| 3,601,356 | 8/1971 | Yurick | 249/192 |
| 3,862,737 | 1/1975 | Fuston, Jr. | 249/196 |
| 3,877,674 | 4/1975 | Cerutti | 249/196 |
| 3,899,152 | 8/1975 | Avery | 249/189 |
| 3,899,155 | 8/1975 | Ward | 249/189 |
| 4,034,957 | 7/1977 | Cody | 249/189 |
| 4,301,990 | 11/1981 | Schwörer | 249/192 |

FOREIGN PATENT DOCUMENTS

| | | | |
|---|---|---|---|
| 0062420 | 10/1982 | European Pat. Off. | 249/44 |
| 2757450 | 6/1979 | Fed. Rep. of Germany | 249/33 |

*Primary Examiner*—Jay H. Woo
*Assistant Examiner*—James C. Housel
*Attorney, Agent, or Firm*—Holman & Stern

[57] ABSTRACT

A formwork panel is formed from metal longitudinal members and metal transverse members interconnected by devices such as screws to form a dismountable formwork panel. The panels may be interconnected by other connector devices to form larger composite panels of various sizes and shapes. The panels may be formed from a kit of parts for easy assembly and disassembly at a construction site.

11 Claims, 3 Drawing Sheets

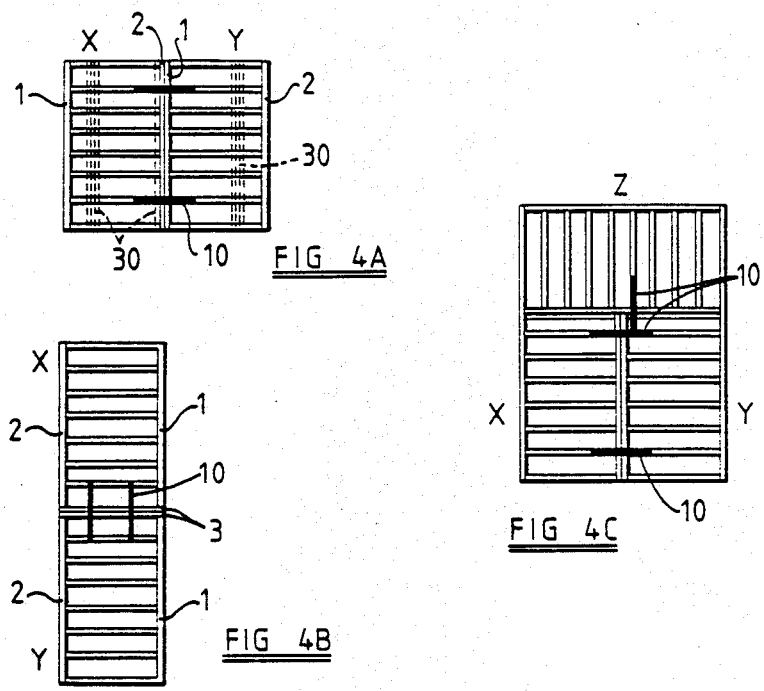
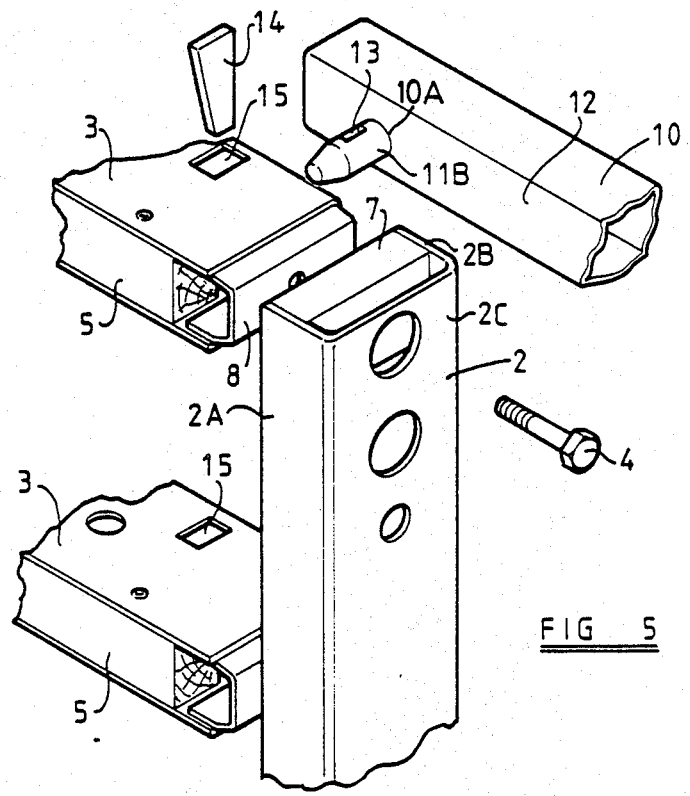

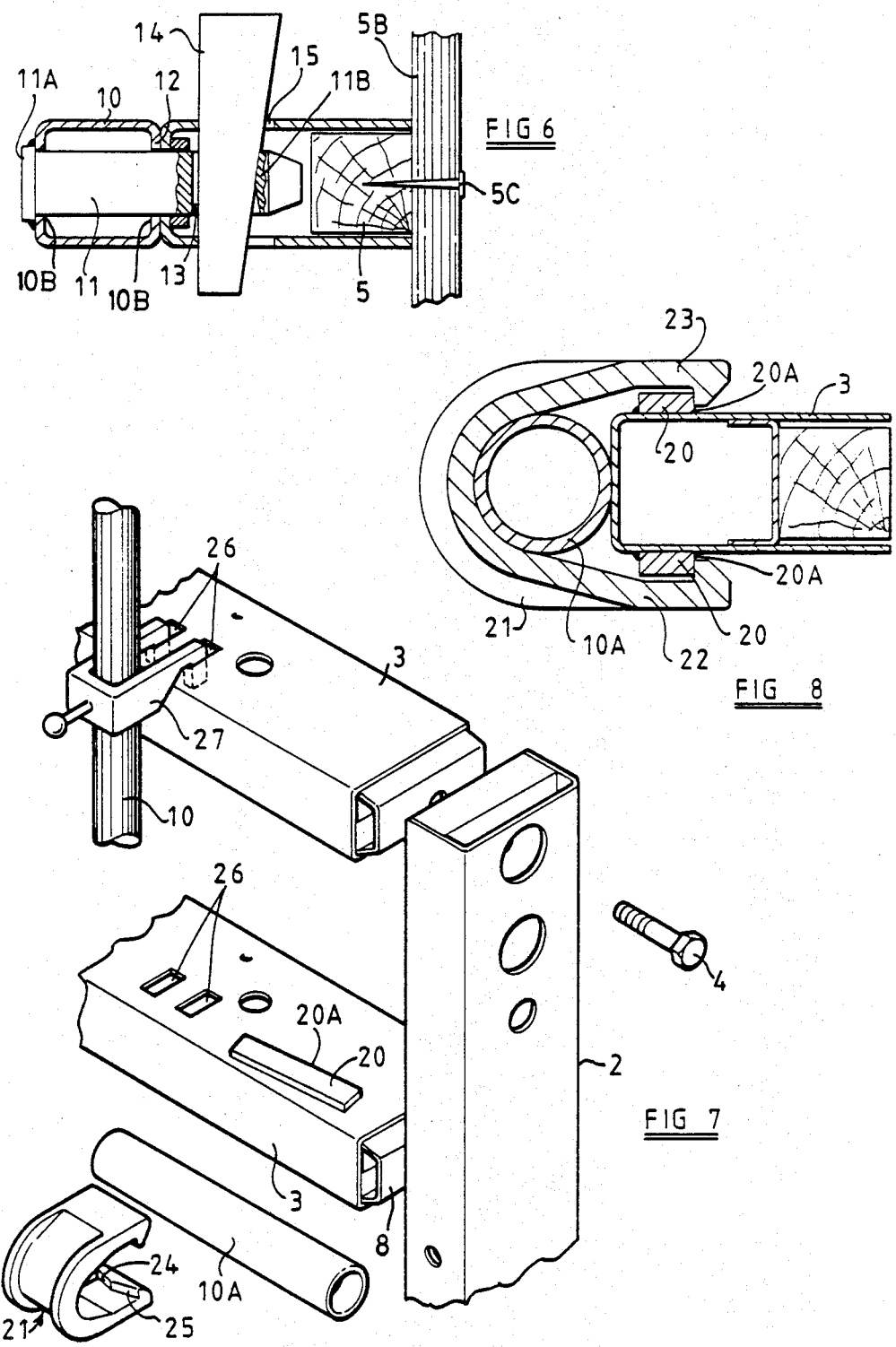

FORMWORK PANEL

BACKGROUND OF THE INVENTION

1. Field of the Invention

This invention relates to a formwork panel for use in the casting of concrete stuctures and consisting essentially of a metal frame with longitudinal and transverse members to which a facing panel is secured to provide a casting surface, in use.

2. Description of the Prior Art

Hitherto, panels of this kind have been formed by welding together the frame members and securing the facing panels in position by welding or otherwise fastening them to the frame members, the sizes of the panels varying widely according to the requirements of use. Larger size versions of such panels can be inconvenient to handle on site and can also be difficult to store and transport. They also suffer from the disadvantage that damage to a relatively small part of a panel can lead to scrapping of the entire panel and because of the nature of the work in which such panels are used, this can be very inconvenient and give rise to considerable expense.

When very large areas of framework are required, composite panels are formed by connecting together numbers of individual panels. Because of the large variety of sizes and shapes of composite panels required on building sites, it has hitherto been necessary, in order to achieve the required degree of on site flexibility, to stock a large range of shapes and sizes of individual panels, with consequent inconvenience and expense.

BRIEF SUMMARY OF THE INVENTION

An object of the present invention is to provide a formwork panel of the aforesaid kind which minimizes or avoids the drawbacks referred to.

According to the invention, a formwork panel comprises a plurality of longitudinal metal frame members and a plurality of transverse metal frame members adapted for interconnection in releasable manner to form a framework, and a facing panel secured to the framework in releasable manner to provide a casting surface, in use.

In one convenient arrangement, the longitudinal members are provided with recesses at lengthwise intervals to receive end portions of the transverse members, at least some of the transverse members being positively secured to the longitudinal members by retention means, such as screws. When retention means are not provided for all of the transverse members, the remainder thereof are retained in position by co-operation with respective ones of said recesses.

The transverse members may be of suitable shape, typically of angle or channel form, to embrace infill members, normally of timber, which permit facing panels to be secured to the framework by fixing members such as nails or screws driven into the infill members. Alternatively, the transverse members may be of closed hollow section and the facing panels secured directly to the metal sides thereof, as by screws for example.

Each panel may conveniently be adapted to co-operate with connectors for interconnecting a plurality of assembled panels to form larger composite panels. In one form of such composite panel, each such connector may conveniently include an elongate connecting element for spanning between frame members of adjacent panels, and pin and wedge devices arranged to act between said connecting element and respective ones of said frame members.

In another form of such composite panel, each connector may conveniently include an elongate connecting element for spanning between frame members of adjacent panels, and clamp devices arranged to act between said connecting element and respective ones of said frame members, each of which latter is provided with wedge surfaces for co-operation respectively with corresponding surfaces on the clamp members to hold said element tightly in engagement with the adjacent frame members.

From another aspect, the invention includes a kit of parts comprising a plurality of longitudinal metal frame members, a plurality of transverse metal frame members, and means operable to connect the transverse members to the longitudinal members to form a framework to which a facing panel may be secured, in use.

BRIEF DESCRIPTION OF THE DRAWINGS

The invention will now be described, by way of example, with reference to the accompanying drawings wherein:

FIGS. 4A, 4B and 4C are respective plan views of composite panels constructed from panels similar to that in FIG. 1;

FIG. 5 is an exploded view, of part of the panel of FIG. 1, showing connector devices for connecting separate parts to form a panel and for connecting together separate panels to form a composite panel;

FIG. 6 is a fragmentary cross-sectional view of part of FIG. 5 in assembled condition;

FIG. 7 is a view similar to FIG. 5 showing parts of an alternative form of connector for connecting together separate panels to form a composite panel; and FIG. 8 is a fragmentary cross-sectional view of the clamping part of FIG. 7 in its assembled condition.

DETAILED DESCRIPTION

Figure 1:
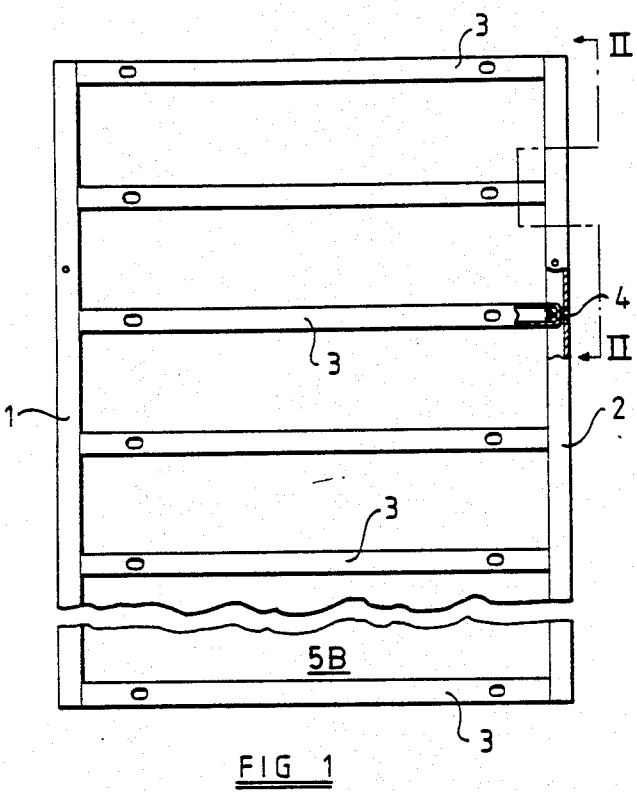
FIG. 1 is a plan view showing the framework forming part of the formwork panel of the invention.
Figure 2:
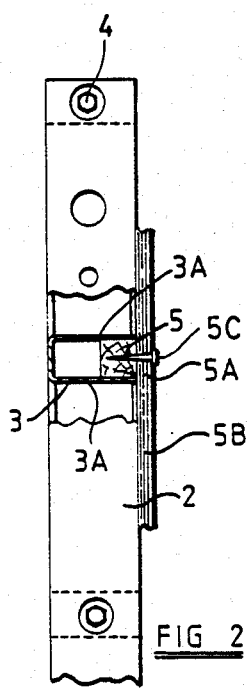
FIG. 2 is a right side elevational and partly cross-sectional view, taken along line II—II of FIG. 1, on an enlarged scale, of part of the formwork panel of FIG. 1.
Figure 3:
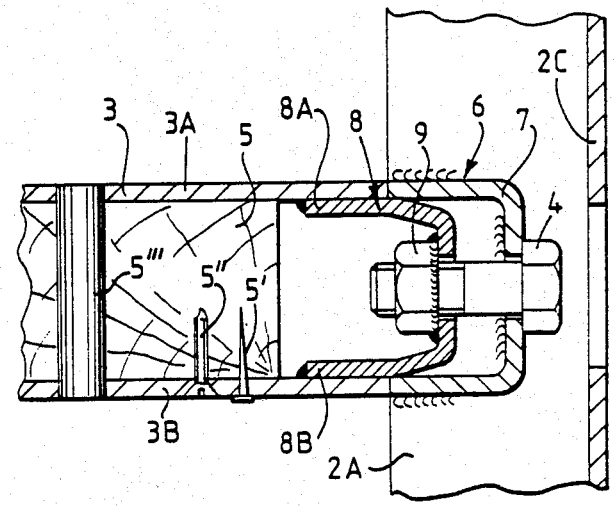
FIG. 3 is a fragmentary cross-sectional view, on an enlarged scale of part of the framework of FIG. 1.

Referring to FIGS. 1 to 3, these illustrate a framework for use as the basis of a formwork panel of the invention including a pair of longitudinal side members 1, 2, between which extend at spaced intervals transverse members 3 which are releasably secured to the side members by bolts 4, for example. As will be seen more clearly from FIGS. 2 and 3, at least some of the transverse members 3 are channel-shaped and house timber battens 5 between the opposed sides 3A thereof, the battens conveniently being fixed in position by nails 5′, screws 5″, or spring dowel pins 5‴, or a combination of some or all of these means. The outer surface 5A of each batten is preferably substantially flush with the outer surface of an adjacent longitudinal member 2 and a facing panel 5B would normally be secured to the battens 5 (FIG. 2) conveniently by nailing or similar means 5C, to provide a casting surface.

Each longitudinal member 1, 2 is also generally channel-shaped and the transverse members 3 are received within the open end of the channel. The longitudinal members 1, 2 are provided at the required intervals with fixing recesses 6 formed by U-shaped elements 7 welded to the sides of the longitudinal members 1, 2 with their open ends facing away from the base 2C of the longitudinal member 1, 2. Each of the transverse members 3 is provided with a generally U-shaped fixing element 8 of which the arms 8A, 8B are inserted between the sides 3A, 3B of the transverse element 3 and secured therein, as by welding. It will be seen that the transverse elements 3 may be readily releasably secured to the longitudinal elements 1, 2 by inserting the fixing elements 8 within the U-shaped elements 7 of the longitudinal elements, the securing being conveniently effected by means of the bolts 4 engaging nuts 9 secured within the fixing elements 8.

FIGS. 4A to 4C illustrate, respectively, three examples of how a plurality of panels X, Y, Z, may be joined together to form a larger composite panel. In one arrangement (FIG. 4A) this is accomplished by placing the panels X and Y side-by-side with their longitudinal members 1, 2 juxtaposed as shown, placing fixing bars 10 across the adjoining panels in alignment with the transverse members thereof and securing the bars in position on said transverse members to produce the composite panel. In another arrangement (FIG. 4B), a pair of panels X, Y, are placed side-by-side with their end transverse members 3 juxtaposed, fixing bars 10 then being placed at right angles across the junction between the adjoining panels and secured in position. In a third example, (FIG. 4C) a pair of panels X, Y are joined in the manner of FIG. 4A and a third panel Z, having a length equal to twice the width of a panel X, Y is placed along one side of the composite X, Y, panel and secured in position by one or more fixing bars 10 placed at right angles to bridge the junction between the X, Y panel and panel Z. It will be understood that many other combinations of panels and fixing bars may be used according to particular requirements.

One means for securing adjoining panels in position is illustrated in more detail in FIGS. 5 and 6. Each fixing bar is typically in the form of a hollow tube 10 of generally rectangular cross-section, the tube having aligned holes 10B respectively in opposed sides thereof and a pin 11 extending through the holes and secured in position, in this embodiment, by welding a head 11A of the pin against a side of the tube with which it is brought into engagement. The pin may alternatively be used without being secured to the fixing bar. A portion 11B of the pin projects from a side 12 of the tube and is provided with a generally diametrical slot 13 therethrough to receive a fixing wedge 14 in the manner to be described. Each transverse member 3 is provided with a window 15 to permit access to the slot 13 for the wedge. Thus, with a fixing bar 10 arranged in position in the manner illustrated in FIG. 6, with the slot 13 opposite to the window 15, the wedge 14 may be driven home to the position indicated in which one side of the wedge engages an edge portion of the slot 15 and the other side of the wedge engages an opposed inside wall of the slot 13. Each fixing bar is provided with at least two projections 11B and several can be provided according to the length of the fixing bar and the degree of security required. Facing panels 5B may then be secured to the battens 5, as before to complete the composite panel for use in a casting operation.

FIGS. 7 and 8 illustrate an alternative arrangement for securing adjoining panels in position. Each fixing bar is again in the form of a hollow tube 10A, this time of circular cross-section. The bar 3 is provided with ribs 20, formed in this instance by plates secured, respectively as by welding, to the upper and lower surfaces of the member 3 and disposed at an angle to the longitudinal axis of the member 3 to provide at their edges 20A wedge surfaces for the purpose to be described. A generally U-shaped clamp member 21 is provided, being shaped at its base to receive the tube 10A closely therein and having a pair of arms 22, 23 of sufficient length to permit them to engage behind the axially inner ends of the ribs 20 with the tube disposed between the base of the clamp member and the lateral wall of the member 3, as illustrated in FIG. 8. The ribs 20 may alternatively be formed integrally with the members 3 by pressing for example, or may be replaced by indents providing internal wedge surfaces for engagement by projecting portions of the clamp members.

Each arm of the clamp is formed on its inner surface with a pair of mutually oppositely inclined wedge surfaces 24, 25, one of which will co-operate with the wedge surface 20A of the adjacent rib 20 when the components are assembled. This twin surface arrangement enables the clamp to be used with either of its arms uppermost, as will become apparent hereafter. The angles of the surfaces 24, 25 are chosen so that the operative ones of these surfaces, depending upon the disposition of the clamp, form approximately the same angle with the longitudinal direction of the member 3 as the surfaces 20A of the ribs 20.

In order to secure the tube 10A to the bar 3, the clamp member 23 is engaged around the tube and, with the tube engaged against the member 3, as seen in FIG. 7, the arms 22, 23 of the clamp member can be engaged behind the wedge surface 20A of the ribs 20 and the clamp member driven home so that, in the case illustrated, the surfaces 25 of the arms come into tight wedging engagement with the rib surfaces 20A, effectively clamping the tube 10A to the member 3. The same action can be effected with the clamp turned through 180° about an axis at right angles to the tube 10A, which means that the orientation of the clamp does not have to be chosen carefully by site workers and its use is thereby facilitated.

The transverse members 3 may be provided, as shown, with pairs of slots 26 spaced to receive the hooked arms of a standard twin-armed formwork clamp 27, illustrated in FIG. 7 by which means tubular connecting members such as 10 or 10A may be secured along the backs of a plurality of panels to connect the panels together to form composite panels. This arrangement is particularly convenient for fixing panels in the end-to-end configuration of FIG. 4B. The position for the clamp has been chosen for the purpose of illustration only and the clamp would be located, in use, at any convenient position according to the desired run of the tubular connecting members.

The means for fixing the transverse members 3 to the longitudinal members 2 may be varied as desired, as may be the means for securing panels together to form composite panels. It will be seen that, since the panel of the invention may be readily completely dismantled, not only may it be more readily transported, packed, cleaned and stored, but in the event that any part thereof becomes damaged, this may be readily replaced without the necessity for replacing the entire panel, as would be required with many conventional panels. The facing panel, which may be of metal or timber, may be readily fitted on at a building site and this again can be easily replaced should damage occur. By providing longitudinal and transverse members of differing lengths, the sizes of individual panels may readily be varied, providing flexibility in the shapes and sizes of composite panels which may be formed, with the number of components reduced to a minimum.

It is conventional practice to secure soldiers 30 to formwork panels or panel assemblies to provide additional rigidity. These would extend longitudinally and normally be secured in conventional manner to the opposed faces of the transverse members 3 by hook bolts engaged in holes in said members and co-operating with clamp plates attached to the soldier. In the composite versions of the panel of the invention, soldiers may be attached to the connecting bars 10, such attachment being facilitated by providing the connecting bars with lateral flanges against which clamps may be engaged to secure the soldiers in position. Typical soldier dispositions are illustrated diagrammatically in broken lines in FIG. 4A.

I claim:

1. A formwork panel frame having a median plane comprising:
    a plurality of substantially channel-shaped longitudinal metal frame members each having a base disposed substantially perpendicularly to the median plane of the frame and spaced substantially parallel side walls each extending substantially parallel to said median plane, said base having an inner surface;
    transverse members extending between said longitudinal frame members, each transverse member having opposite main end areas and projections respectively extending generally axially beyond each of said main end areas;
    a plurality of recess means disposed between said side walls of said longitudinal frame members forming recesses for receiving said transverse member projections closely therein, so that interengagement of said projections and recesses locates said transverse members both laterally and longitudinally relative to said longitudinal frame members;
    a base facing surface on each recess means facing toward and spaced from said inner surface of said base of a respective longitudinal frame member;
    a screw receiving hole in said base facing surface on each recess means;
    a threaded opening in each transverse member projection aligned with a respective screw receiving hole;
    screw threaded means insertable through said hole and disposable between said inner surface of said base and a respective recess means threadedly engaging with a respective threaded opening and reacting against said base facing surface of the respective recess means throuh which said screw threaded means passes for releasably interconnecting said projections and recess means for securing said frame and transverse members rigidly together; and
    means for securing a panel to the frame for providing a casting surface in use.

2. A formwork panel frame as claimed in claim 1 wherein:
    one of said side walls of each longitudinal frame member comprises an outermost panel-supporting surface; and
    each transverse member has a further outermost panel-supporting surface flush with said outermost panel-supporting surfaces of said longitudinal frame members, so that said outermost supporting surfaces of all of said longitudinal frame and transverse members comprise a continuous panel-supporting surface at one side of the frame.

3. A formwork panel frame as claimed in claim 2 wherein:
    each transverse member has a U-shaped cross-section with side members thereof extending toward said further outermost panel-supporting surface;
    said means for securing a panel to the frame comprises wooden battens fixed in said transverse members between said side members thereof; and
    fastening means are provided for securing a panel to said battens.

4. A formwork panel frame as claimed in claim 1 wherein:
    each transverse member has a closed hollow cross-section and a plurality of sides; and
    a panel is attachable directly to one side thereof.

5. A formwork panel frame as claimed in claim 1 wherein:
    said base of said longitudinal frame member has an access opening aligned with each recess means for providing access therethrough to a respective fastening means from the frame exterior.

6. A composite formwork panel frame comprising:
    a plurality of formwork panel frames each having a median plane and comprising:
    a plurality of substantially channel-shaped longitudinal metal frame members each having a base disposed substantially perpendicularly to the median plane of the frame and spaced substantially parallel side walls each extending substantially parallel to said median plane;
    elongated transverse members having a longitudinal axis and extending between said longitudinal frame members, each transverse member having opposite main end areas and projections respectively extending generally axially beyond each of said main end areas;
    recess means disposed between said side walls of said longitudinal frame members forming recesses for receiving said transverse member projections closely therein, so that interengagement of said projections and recesses locates said transverse members both laterally and longitudinally relative to said longitudinal frame members;
    mechanical fastening means releasably interconnecting said projections and recess means for securing said frame and transverse members rigidly together, and means for securing a panel to the frame for providing a casting surface in use;
    at least one elongate connecting element in the form of a tubular member having a circular outer cylindrical surface spanning between adjacent frames; and
    connectors engageable with said elongate connecting element and said adjacent frames for connecting said adjacent frames together, each connector comprising
    at least one wedge surface on at least one transverse member of each adjacent frame,
    a clamping member,
    a pair of oppositely-directed wedge surfaces on each clamping member co-operatively engageable with said at least one wedge surface for clamping said elongate member to each adjacent frame so that said clamping member can be used in either of two clamping positions mutually displaced by 180°, said clamping member comprising a U-shaped member having two leg portions extending from a base portion having an inner surface conforming to said outer surface of said tubular member, said at least one wedge surface on said at least one transverse member comprising a pair of wedge bars on opposite sides of said at least one transverse member, each wedge bar having a rectangular cross-section and extending at an angle with respect to said longitudinal axis, and edges on said wedge bars extending substantially perpendicular from said opposite sides of said at least one transverse member, and projections on said two leg portions extending inwardly toward each other, said pair of oppositely-directed wedge surfaces on each clamping member being on each projection and being engageable with said edges on said wedge bars.

7. A composite formwork panel frame as claimed in claim 6 wherein:

one of said side walls of each longitudinal frame member comprises an outermost panel-supporting surface; and each transverse member has a further outermost panel-supporting surface flush with said outermost panel-supporting surfaces of said longitudinal frame members, so that said outermost surfaces of all of said longitudinal frame and transverse members comprise a continuous panel-supporting surface at one side of the frame.

8. A formwork panel frame as claimed in claim 6 wherein:

each recess means has an outwardly facing surface facing toward said base of a respective frame member;

a screw receiving hole is provided in said outwardly facing surface of each recess means;

said mechanical fastening means are threaded screw means; and each transverse member projection has a threaded opening aligned with a respective hole for threaded engagement with one of said screw means, so that a screw means inserted through one of said holes reacts against said outwardly facing surface of the respective recess means through which it passes.

9. A composite formwork panel frame as claimed in claim 8 wherein:

said outwardly facing surface is spaced from the adjacent inner surface of said base of the respective longitudinal frame member; and said screw means is disposed between said inner surface of said base and recess means.

10. A composite formwork panel frame as claimed in claim 9 wherein:

said base of said longitudinal frame member has an access opening aligned with each recess means for providing access therethrough to a respective fastening means from the frame exterior.

11. A composite formwork panel as claimed in claim 7 wherein:

each transverse member has a U-shaped cross-section with side members thereof extending toward said further outermost panel-supporting surface;

said means for securing a panel to the frame comprises wooden battens fixed in said transverse members between said side members thereof; and fastening means are provided for securing a panel to said battens.

* * * * *